United States Patent
Isola et al.

(10) Patent No.: US 10,462,141 B2
(45) Date of Patent: *Oct. 29, 2019

(54) NETWORK DEVICE INFORMATION VALIDATION FOR ACCESS CONTROL AND INFORMATION SECURITY

(71) Applicant: BANK OF AMERICA CORPORATION, Charlotte, NC (US)

(72) Inventors: Rahul Isola, Charlotte, NC (US); Jeremiah S. Nicholson, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 204 days.

This patent is subject to a terminal disclaimer.

(21) Appl. No.: 15/659,915

(22) Filed: Jul. 26, 2017

(65) Prior Publication Data

US 2019/0036925 A1    Jan. 31, 2019

(51) Int. Cl.
*H04L 29/06*    (2006.01)

(52) U.S. Cl.
CPC .......... *H04L 63/10* (2013.01); *H04L 63/101* (2013.01); *H04L 63/107* (2013.01); *H04L 63/1425* (2013.01); *H04L 63/1441* (2013.01); *H04L 63/20* (2013.01)

(58) Field of Classification Search
CPC ... H04L 63/10; H04L 63/107; H04L 63/1441; H04L 63/20; H04L 63/1425; H04L 63/101
See application file for complete search history.

(56) References Cited

U.S. PATENT DOCUMENTS

| | | |
|---|---|---|
| 7,181,769 B1 | 2/2007 | Keanini et al. |
| 7,516,487 B1 | 4/2009 | Szeto et al. |
| 7,523,485 B1 | 4/2009 | Kwan |
| 7,562,390 B1 | 7/2009 | Kwan |
| 7,735,114 B2 | 6/2010 | Kwan et al. |
| 8,239,929 B2 | 8/2012 | Kwan et al. |

(Continued)

OTHER PUBLICATIONS

Isola, R. et al., "Network Device Location Information Validation for Access Control and Information Security," U.S. Appl. No. 15/660,053, filed Jul. 26, 2017, 56 pages.

(Continued)

*Primary Examiner* — Carl G Colin
*Assistant Examiner* — Han Yang
(74) *Attorney, Agent, or Firm* — Michael A. Springs

(57) ABSTRACT

A system that includes a threat management server configured to store a device log identifying device information for endpoint devices that have passed authentication. The threat management server is configured to identify an endpoint device from the device log file and to identify a switch connected the endpoint device. The threat management server is further configured to send a device information request to the switch requesting device information for the endpoint device. The threat management server is configured to compare the received information to the information in the device log file. The threat management server is configured to block the endpoint device from accessing a communications network in response to determining the received device information does not match the information in the device log file.

20 Claims, 7 Drawing Sheets

(56) References Cited

U.S. PATENT DOCUMENTS

| | | |
|---|---|---|
| 8,447,865 B2 | 5/2013 | Bansal et al. |
| 8,453,227 B2 | 5/2013 | Aiello et al. |
| 8,533,227 B2 | 9/2013 | Schneider |
| 8,938,782 B2 | 1/2015 | Sawhney et al. |
| 8,949,827 B2 | 2/2015 | Becker et al. |
| 8,984,504 B2 | 3/2015 | Becker et al. |
| 9,553,891 B1 | 1/2017 | Isola et al. |
| 2005/0210265 A1* | 9/2005 | Dombkowski ......... G06F 21/31 713/185 |
| 2010/0024017 A1* | 1/2010 | Ashfield ................. G06F 21/35 726/7 |
| 2013/0252583 A1* | 9/2013 | Brown .................. H04W 12/06 455/411 |

OTHER PUBLICATIONS

Isola, R., "Switch Port Leasing for Access Control and Information Security," U.S. Appl. No. 15/660,291, filed Jul. 26, 2017, 58 pages.

Isola, R. et al., "Port Authentication Control for Access Control and Information Security," U.S. Appl. No. 15/660,501, filed Jul. 26, 2017, 55 pages.

Isola, R., "Network Device Spoofing Detection for Information Security," U.S. Appl. No. 15/660,593, filed Jul. 26, 2017, 59 pages.

\* cited by examiner

NETWORK DEVICE INFORMATION VALIDATION FOR ACCESS CONTROL AND INFORMATION SECURITY

TECHNICAL FIELD

The present disclosure relates generally to information security, and more specifically to network access control.

BACKGROUND

Many enterprises have expansive networks that include a large number of network devices. These network environments allow data to be shared among the different network devices. One of the technical challenges that occurs in a network environment is controlling data leakage and unauthorized access to data. For example, a bad actor (e.g. a hacker) may connect a network device to a network to extract data and/or to perform other malicious activities.

Identifying malicious network devices in a large network also poses several technical challenges. Conventional systems typically detect malicious network devices after they have performed some kind of malicious activity. For example, since the malicious device is already connected to the network, the malicious network device is able to extract data and/or perform malicious activities before it is detected. Conventional systems are unable to preemptively identify malicious network device before they perform malicious activities which limits their abilities to provide information security and to control and monitor data access within the network.

Without the ability to control or monitor data access and movement the system is vulnerable to having sensitive data leave the network and/or allowing malicious data (e.g. viruses and spyware) to enter the network. Thus, it is desirable to provide a solution that provides the ability to control and monitor data access and movement within a network.

SUMMARY

One of the technical challenges that occurs in computer technology, such as a network environment, is controlling data leakage and unauthorized access to data. For example, a bad actor may connect an unauthorized network device to a network to extract data and/or to perform other malicious activities. Identifying unauthorized network devices in a large network also poses several technical challenges. Conventional systems typically detect malicious network devices after they have performed some kind of malicious activity. In these systems, since the unauthorized network device is already connected to the network, the malicious network device is able to extract data and/or perform malicious activities before it is detected. Conventional systems are unable to preemptively identify malicious network devices before they perform malicious activities which limits their abilities to provide information security and to control and monitor data access within the network. Without the ability to control or monitor data access and movement the system is vulnerable to having sensitive data leave the network and/or allowing malicious data to enter the network.

The system described in the present application provides a technical solution that enables the system to identify potentially malicious or suspicious network devices that are connected to a network and to block or control their access to the access to the network. The ability to identify, block, and control a suspicious network device's access to the network, improves the operation of the system and the security of the network. For example, the system is able to identify and block a suspicious network device before the device is able to perform any malicious activities, for example, data exfiltration. Thus, the system provides an unconventional technical solution that allows the system to protect itself and the network from attacks by malicious devices.

In one embodiment, system identifies and blocks network devices based on device information discrepancies. For example, the system selects a network device from a device log to check for discrepancies between the device information stored in the device log and the actual device information of the network device. The system identifies a switch connected the network device and requests information about the network device. The system compares the device information received from the switch to the information stored in the device log to identify any differences in the device information. If any differences are found in the device information, the system blocks the network device from accessing the network. Blocking the network device from accessing the network protects the network in the event the network device is a malicious device.

In another embodiment, the system identifies and blocks network devices based on location information discrepancies. The system selects a network device from a device log to check for discrepancies between the location information stored in the device log and the actual location of the network device. The system identifies a switch connected the network device and requests location information about the network device. The system compares the location information received from the switch to the location information stored in the device log to identify any differences in the location information. If any differences are found in the location information, the system blocks the network device from accessing the network. Blocking the network device from accessing the network protects the network in the event the network device is a malicious device.

In another embodiment, the system identifies and blocks network devices that are spoofing a trusted network device. When the system determines there are more than one instance of a network device present in a device log, the system identifies switches connected to each instance of the network device. The system sends location information requests to each of the switches requesting location information for the instances of the network device. The system compares the received location information for each instance of the network device to the location information for network device in the device log. Based on the comparison, the system identifies the spoofed instance of the network device and blocks the spoofed instance from accessing the network. Blocking the spoofed instance of the network device from accessing the network protects the network device from any malicious activities that may be performed by the spoofed instance of the network device.

In another embodiment, the system provides access control to the network by activating temporary port leases for network devices. The system receives a port lease request that identifies a port on a switch and a network device. The system determines whether the network device is a device that has previously failed authentication. The system also determines whether a network device identifier (e.g. a MAC address) is known and present in the port lease request. When the system determines that the network device has not previously failed authenticated and the network device identifier is known, the system will activate a port lease for the network device. The port lease provides access to the network for the network device for a limited amount of time (e.g. 24 hours). When the system determines that the network device has not previously failed authenticated and the network device identifier is unknown, the system will activate a port lease for network device that is for a short duration of time than when the network device identifier is known, for example, 1 hour. The system is able to protect itself by offering port leases that are valid with variable amounts of time depending on the network device connected to a port and the type of information known about the network device. In other words, the system is able to activate short term port lease for unknown network devices compared to longer term port lease for known network devices. The ability to adjust how long a port lease is active allows the system to control how long an unknown device has access to the network and controls the amount of time the unknown device has to perform any malicious activities.

In another embodiment, the system provides access control by monitoring authentication setting on ports of a switch. The system interrogates a switch for switch information identifying ports configured to bypass authentication and device information about network devices connected to the ports configured to bypass authentication. The system compares the received switch information with a port exemption log to determine if there are any discrepancies between the switch information and the port exemption log. The system enables port authentication for any ports with an information discrepancy. The system also checks for discrepancies between device information from the switch and device information in the port exemption log. The system enables port authentication for any ports with a device information discrepancy. The system is able to protect itself by enabling port authentication when there are any discrepancies with information related to port.

Information discrepancies may be indicative of a suspicious network device connected to the port. The system enables port authentication to further investigate any suspicious network devices by having them authenticate themselves.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
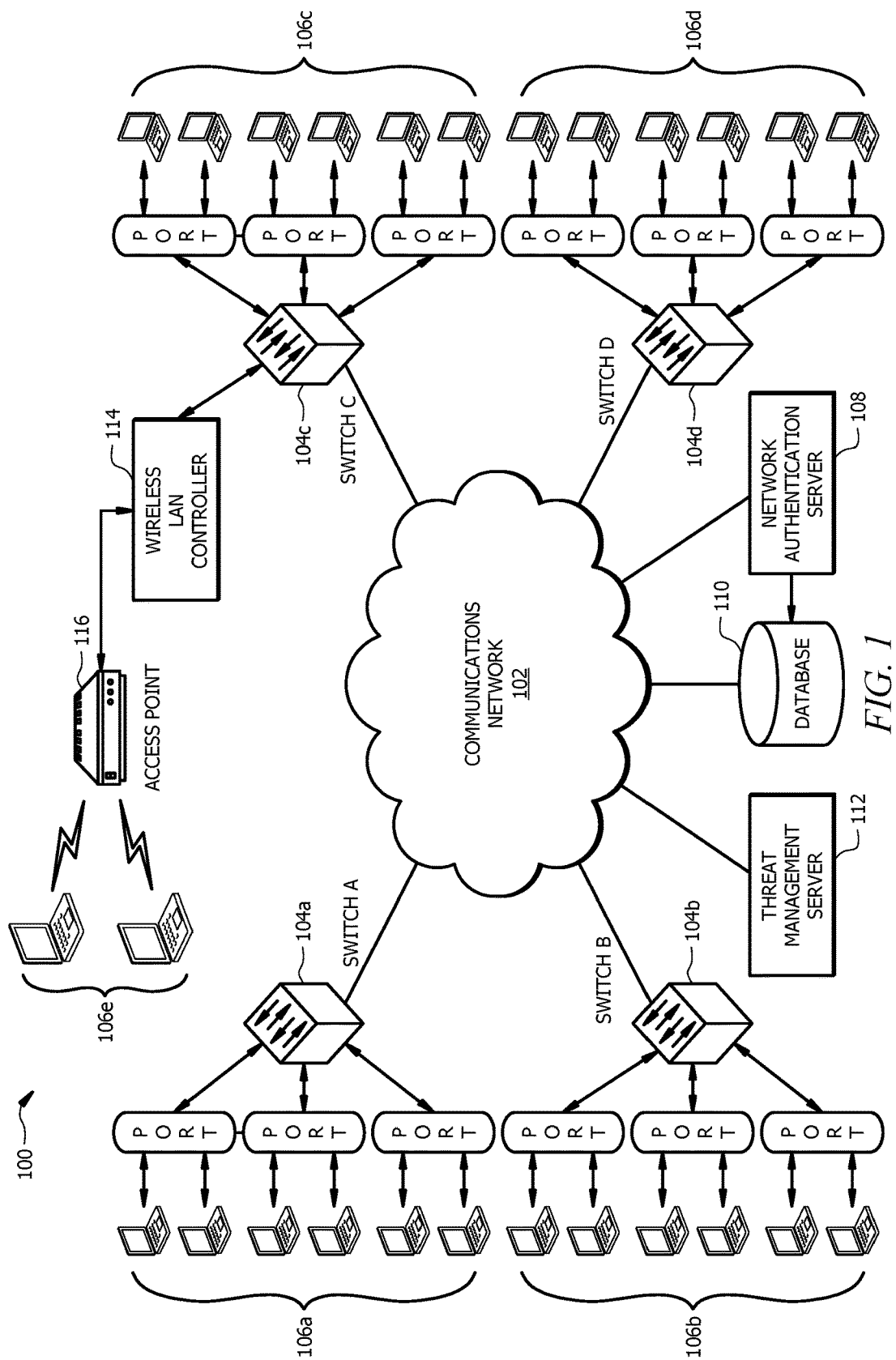
FIG. 1 is a schematic diagram of an embodiment of a system configured to implement network access control.

FIG. 1 is a schematic diagram of an embodiment of a system 100 configured to implement network access control. System 100 is generally configured to support a number of different operations, including but not limited to, identifying unknown or undesirable devices (e.g., non-compliant, rogue, or malicious devices), determining the location of the undesirable devices, collecting information from a switch connected to the undesirable devices, and blocking the undesirable devices from being able to access the network and/or isolate the undesirable in a safe zone within the network. For example, the system 100 is configured to detect when a bad actor connects a malicious device to port on a switch. The system 100 is configured to identify the malicious device and to block the malicious device from accessing the network. In other examples, the system 100 is configured to isolate and monitor malicious devices. Isolating and monitoring malicious devices allows the system 100 to collect information about malicious devices, which may be later used to further improve the security of the system 100.

The system 100 is further configured to identify and block endpoint devices 106 based on device information and/or location information discrepancies. For example, the system 100 is configured to periodically compare information stored in device log files with the actual configuration of a switch 104. The system 100 is able to detect inconsistencies between endpoint device 106 connected to the switch 104 and the information stored for the switch 104. This process allows the system 100 to detect suspicious endpoint devices 106 and to block them from accessing the communications network 102. Examples of this process are described in FIGS. 3 and 4.

The system 100 is further configured to identify and block endpoint devices 106 that are spoofing a trusted endpoint device 106. For example, the system 100 is configured to detect when multiple instances of an endpoint device 106 are connected the communications network 102. Multiple instances of an endpoint device 106 indicates that the endpoint device 106 is being spoofed by a malicious endpoint device 106. This process allows the system 100 to detect malicious endpoint devices 106 and to block them from accessing the communications network 102. An example of this process is described in FIG. 5.

The system 100 is further configured to provide access control to the communications network 102 by activating temporary port leases for endpoint devices 106. In some instances, an endpoint device 106 is unable to authenticate itself to access the communications network 102. For example, when a new machine is being configured to be added to the communications network 102. The system 100 provides the ability to allow an endpoint device 106 to access the communications network 102 based on the information known or available about the endpoint device 106. For example, when the MAC address is known for an endpoint device 106 a port lease is activated for the endpoint device 106. When the MAC address is unknown for the endpoint device 106, a port lease may still be activated but for a shorter duration of time than when the MAC address is known. This process allows the system 100 to provide access control when allowing endpoint devices 106 to temporarily access the communications network 102. An example of this process is described in FIG. 6.

The system 100 is further configured to provide access control by monitoring authentication setting on ports of a switch 104. The system 100 is configured to periodically compare information stored in device log files with the actual configuration of a switch 104. The system 100 is able to detect inconsistencies between port settings of the switch 104 and the information stored for the switch 104. This process allows the system 100 to detect suspicious activities and endpoint devices 106 and to block suspicious endpoint devices 106 from accessing the communications network 102. An example of this process is described in FIG. 7.

In some embodiments, the system 100 is configured to authenticate a user, to determine disconnection capabilities of switches coupled to undesirable devices, to facilitate disconnecting undesirable devices, and to monitor the network for subsequent connection attempts by the undesirable devices to reconnect to the network. For example, the system 100 is configured to identify malicious devices that are attempting to connect to the network and to block the malicious devices from accessing the network. Detecting, removing, and blocking malicious devices from the network allow the system 100 to enhance network security by providing improved data access control. In some embodiments, these tasks may be performed by a particular device, such as a threat management server 112. In other implementations, these tasks may be performed in a distributed fashion using various components that interact with each other over a network.

System 100 comprises switches 104, endpoint devices 106, a network authentication server (NAS) 108, a database 110, a threat management server 112, a wireless LAN controller 114, and an access point 116 interconnected by one or more networks, represented by communications network 102. System 100 may be configured as shown in FIG. 1 or in any other suitable configuration as would be appreciated by one of ordinary skill in the art upon viewing this disclosure.

The communications network 102 represents communication equipment, including hardware and any appropriate controlling logic, for interconnecting elements and facilitating communication between interconnected elements. The communications network 102 may include local area networks (LANs), metropolitan area networks (MANs), wide area networks (WANs), any other public or private network, local, regional, or global communication network such as the Internet, enterprise intranet, other suitable wired or wireless communication link, or any combination thereof. The communications network 102 may include any combination of gateways, routers, hubs, switches, access points, base stations, and any other hardware, software, or a combination of the preceding that may implement any suitable protocol. The communications network 102 may include other types of networks, including wireless or wired networks.

The communications network 102 is configured to interconnect the switches 104, the endpoint devices 106, the NAS 108, the database 110, the threat management server 112, the wireless LAN controller 114, and the access point 116. The use of the communications network 102 facilitates identifying, blocking, and/or monitoring of undesirable devices regardless of the geographic location or communication protocols employed by network components or devices on the network. While only one communications network 102 has been illustrated, it should be understood that other embodiments may operate using multiple communications networks 102. In addition, other embodiments may employ one or more wired and wireless networks in communications networks 106.

System 100 comprises switches 104a, 104b, 104c, and 104d operably coupled to the communications network 102. The switches 104 represent communication equipment, including hardware and any appropriate controlling logic, for interconnecting and facilitating data communication to and from endpoint devices 106. Examples of switches 104 include, but are not limited to, gateways, call managers, routers, hubs, switches, access points, base stations, cellular towers, radio networks, satellite telephone equipment implementing appropriate protocols for wireless telephony communications. While only a select number of switches 104 have been illustrated, it should be understood that other embodiments may operate using any suitable number of switches 104. In addition, other embodiments may incorporate switches 104 in other wired or wireless networks coupled to the communications network 102 of system 100.

The access point 116 is any network hardware device (and accompanying software) that allows an endpoint device 106 to connect to the communications network 102. An example of the access point 116 includes, but is not limited to, a router. The access point 116 may allow for both wireless connections and wired connections to the communications network 102. For example, an endpoint device 106 may connect wirelessly to the access point 116 or may connect to the access point 116 via a wired connection (e.g. an Ethernet cable). The system 100 may comprise any suitable number of access points 116.

The wireless LAN controller 114 is configured to control and manage the access points 116. For example, the wireless LAN controller 114 may configure the access points 116 to connect to communications network 102. In some embodiments, the wireless LAN controller 114 may screen wireless connection attempts to the communications network 102 and may block attempts that are deemed suspicious or compromised. For example, the wireless LAN controller 114 may maintain a blacklist that identifies endpoint devices 106 that should be blocked from connecting wirelessly to the communications network 102. The wireless LAN controller 114 can connect to the access point 116 and vice versa to allow for end point devices 106 to connect to the communications network 102 via the access point 116 and wireless LAN controller 114. In FIG. 1, the wireless LAN controller 114 is shown operably coupled to a single access point 116. In other examples, the wireless LAN controller 114 may be configured to manage and control any number of access points 116 of system 100.

System 100 comprises endpoint devices 106a, 106b, 106c, 106d, and 106e operably coupled to the communications network 102 through switches 104. The endpoint devices 106 represent any suitable hardware, including appropriate controlling logic and data, capable of connecting to and communicating data over a network. For example, endpoint devices 106 may include wired or wireless devices including, but not limited to, workstations, laptops or notebook computer systems, printers, Voice over Internet Protocol (VoIP) telephones, Internet Protocol (IP) phones, mobile telephones, advanced phones (e.g. smartphones), personal digital assistants (PDAs), wireless handsets, notebook computer systems, tablet computer systems, embedded devices, network sniffers, auxiliary devices, or the like. The endpoint devices 106 may be capable of transmitting and receiving any forms of media including, but not limited to, audio, video, images, text messages, and other data formats, and documents and accessing disparate network-based services.

The NAS 108 represents any appropriate combination of hardware, controlling logic, and data that facilitates user authentication, admission control and logging, policy enforcement, auditing, and security associated with the communications network 102. In some embodiments, the NAS 108 may represent a networked server or collection of networked servers. The NAS 108 may be directly or indirectly coupled to other systems such as the database 110 to store and retrieve information related to network access control and authentication. In one embodiment, the NAS 108 is configured to track attempted and actual connections by endpoint devices 106 to the communications network 102 using switches 104. For example, the NAS 108 may monitor and track the MAC address and/or IP address associated with endpoint devices 106 on communications network 102 and the IP address and/or port of the switch 104 coupled to those endpoint devices 106.

The NAS 108 is configured to authenticate endpoint devices 106 that are connected to a port of a switch 104. The NAS 108 may authenticate endpoint device 106 using an 802.1X protocol, a MAC authentication Bypass (MAB) whitelist, or any other suitable protocol. For example, the NAS 108 may be configured to determine whether the MAC address of an endpoint device 106 is present in a MAB whitelist. The NAS 108 may authenticate the endpoint device 106 when the endpoint device 106 is present in the MAB whitelist. The NAS 108 may also be configured to automatically fail authentication for endpoint devices 106 that are present in a blacklist. In one embodiment, the NAS 108 is configured to send a device identifier identifying an endpoint device 106 in response to the endpoint device 106 connecting to the switch 104. In another embodiment, the NAS 108 is configured to send a device identifier identifying an endpoint device 106 in response to the endpoint device 106 in response to the endpoint device 106 failing authentication.

In certain implementations, the NAS 108 may log appropriate information about each network access attempt by endpoint devices 106 by communicating with database 110 and/or the threat management server 112. For example, the NAS 108 may log information about endpoint devices 106 that pass or fail authentication in a device log file. Additional information about a device log file is described in FIG. 2. In one embodiment, the functionality of the NAS 108 may be provided by a third-party data server. In particular embodiments, the activity recorded at the NAS 108 may be accessed by a log server (not shown) and utilized as an intermediate data repository.

The database 110 comprises suitable hardware and software, including memory and control logic, for storing, accessing, retrieving, and communicating various types of information, for example, network activity data. The database 110 may include any suitable combination of volatile or non-volatile, local or remote devices suitable for storing and maintaining information. For example, the database 110 may include random access memory (RAM), read only memory (ROM), solid state storage devices, magnetic storage devices, optical storage devices, or any other suitable information storage device or a combination of such devices. In one embodiment, the database 110 represents a relational database for storing connection logs and network activity logs of endpoints 106 in a retrievable manner. The database 110 may represent a database service provided by a third-party. In one embodiment, the database 110 may represent a database for storing all connection details related to endpoint devices 106. For example, the database 110 may maintain network activity information such as IP addresses/MAC addresses associated with endpoint devices 106 and IP addresses of switches 104 coupled to particular endpoint devices 106. The database 110 may also maintain port information (e.g. port addresses) for switches 104 or endpoint devices 106. The database 110 may be directly or indirectly coupled to other systems such as the NAS 108 and be capable of storing and retrieving information related to network access based on instructions from the NAS 108. In particular embodiments, the storage and functionality of database 110 may be provided by a third party data server. In some embodiments, the database 110 may reside on an network authentication server, such as the NAS 108.

The threat management server 112 represents any appropriate combination of hardware, controlling logic, and data for facilitating blocking endpoint devices 106 and/or active monitoring of endpoint devices 106. For example, the threat management server 112 may represent a networked server or collection of networked servers capable of communicating with other elements of the system 100 to monitor and prevent access to the network based on appropriate control logic. Additional information about the threat management server 112 is described in FIG. 2.

In particular embodiments, the threat management server 112 may comprise suitable memory to store lists of trusted and untrusted devices. For example, the threat management server 112 may maintain one or more whitelists that identify endpoint devices 106 which are known to be trustworthy. In addition, the threat management server 112 may maintain one or more blacklists that identify endpoint devices 106 which are known to be untrustworthy. In particular embodiments, the blacklists maintained by the threat management server 112 may include endpoint devices 106 that have previously been disconnected from the communications network 102. Additional information about whitelists and blacklists are described in FIG. 2. In FIG. 1, the threat management server 112 is operably coupled to the communications network 102 to facilitate communication with other elements of the system 100. For example, the threat management server 112 may retrieve information from the NAS 108, the database 110, and/or switches 104 to prevent allowing network access to undesired endpoint devices 106. In particular embodiments, the functionality of the threat management server 112 may be provided by a third party data server. In some embodiments, the threat management server 112 may reside on another data server or its functionality may be provided by another data server, such as the NAS 108.

In one embodiment, using an appropriate user interface, the threat management server 112 may be accessed to initiate identifying, blocking, and/or isolating an endpoint device 106. As an example, the user interface may be an interface accessible through a web browser or an application on an endpoint device 106. In one embodiments, the threat management server 112 may access the NAS 108 and/or the database 110 to determine the IP address of the switch 104 coupled to the endpoint device 106 using its MAC address. In another embodiment, the threat management server 112 may transform the MAC/IP address of an endpoint device 106 into an IP address of the switch 104 coupled to the endpoint device 106. For example, the threat management server 112 may use a mapping function that transforms the MAC/IP address of the endpoint device 106 to the IP address of the switch 104 connected to the endpoint device 106. The threat management server 112 may employ any suitable mapping function or technique as would be appreciated by one of ordinary skill in the art. In other embodiments, the threat management server 112 may use any other technique to determine the IP address of the switch 104 connected to an endpoint device 106.

The threat management server 112 may use the IP address of the switch 104 to access the switch 104 to obtain information about the switch 104, for example port information and available features of the switch, and to issue commands to block the endpoint device 106, either logically or physically, from accessing the communications network 102. The threat management server 112 is configured to send one or more commands to logically and/or physically block or isolate the endpoint device 106 from the communications network 102.

In one embodiment, logically disabling or blocking an endpoint device 106 may involve blackholing the endpoint device 106. Blackholing refers to discarding or dropping frames associated with communications from a particular endpoint device 106. An example of the threat management server 112 sending commands to blackhole an endpoint device 106 is described in FIG. 3.

In another embodiment, disabling or blocking an endpoint device 106 may involve physically disconnecting an endpoint device 106 from the communications network 102. For example, the threat management server 112 is configured to send one or more disable commands that triggers a switch 104 to shut off electrical power to the port of the switch 104 that is connected to the endpoint device 106. In one embodiment, this process involves transforming the port from an active (e.g. ON) state to an inactive (e.g. OFF) state. Depending on the network architecture and the type of other endpoint devices 106 that are connected to the same port on the switch 104, physically disconnecting the port may be a viable option to disconnect an undesirable endpoint device 106 from accessing the communications network 102. An example of the threat management server 112 sending commands to disable an endpoint 106 device is described in FIG. 3.

In another embodiment, logically disabling or blocking an endpoint device 106 may involve rerouting data traffic associated with the endpoint device 106 to a safe zone. A safe zone refers to a network location that is deemed to be safe to receive traffic from an untrusted device. For example, a safe zone may represent an empty port or a port on a switch 104 that is connected to devices with acceptable levels of risk, such as a VoIP phone, a printer, or a display. Rerouting traffic associated with an endpoint device 106 to a safe zone mitigates the impact of malicious activity. In one embodiment, a safe zone may also be a network traffic monitoring server that enables live monitoring, recording, and/or forensic analysis of data traffic associated with an endpoint device 106. In one embodiment, the threat management server 112 sends a reroute command identifying the endpoint device 106 to the switch 104. For example, the reroute command may comprise the device identifier for the endpoint device 106. The switch 104 is configured to transform the destination of traffic associated with the endpoint device 106 to a safe zone in response to receiving the reroute command. Transferring the traffic associated with the endpoint device 106 to the safe zone allows the endpoint device 106 to be monitored and recorded in a low-risk environment without jeopardizing the system 100 and communications network 102.

In one embodiment, the threat management server 112 is configured to send one or more commands that triggers a switch 104 to reduce or limit the bandwidth or throughput of the port an endpoint device 106 is connected to. Reducing the bandwidth or throughput of the port the endpoint device 106 is connected to allows the endpoint device 106 to stay engaged with the communications network 102 in a safe manner which allows information to be collected about the endpoint device 106 and its activities. For example, the threat management server 112 may send a command to a switch 104 to reduce the bandwidth of the port connected to an endpoint device 106 and to reroute traffic associated with the endpoint device 106 to a safe zone for recording and/or forensic analysis. In this example, the endpoint device 106 has limited bandwidth which mitigates the impact of any malicious activities performed by the endpoint device 106 while data is collected about the endpoint device 106.

Figure 2:
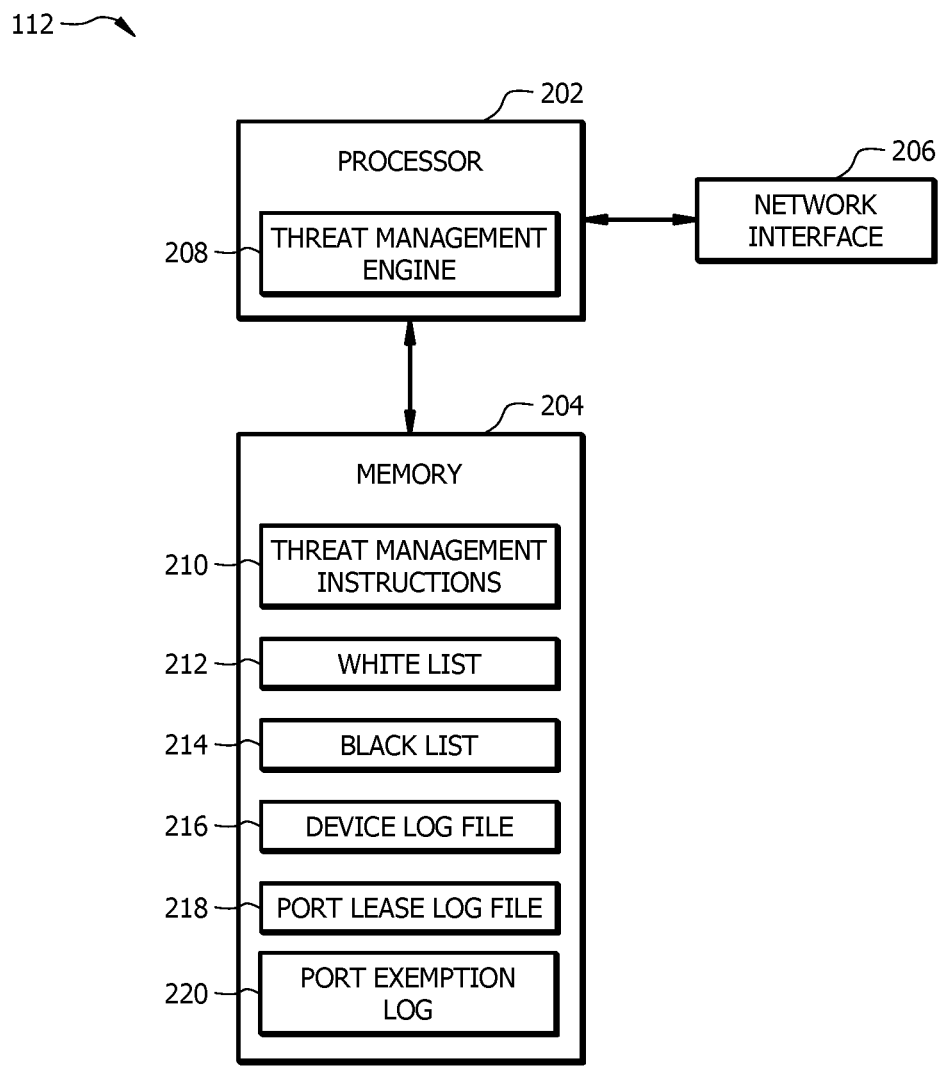
FIG. 2 is a schematic diagram of an embodiment of a threat management server.

FIG. 2 is a schematic diagram of an embodiment of a threat management server 112. The threat management server 112 comprises a processor 202, a memory 204, and a network interface 206. The threat management server 112 may be configured as shown or in any other suitable configuration.

The processor 202 comprises one or more processors operably coupled to the memory 204. The processor 202 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 202 may be a programmable logic device, a microcontroller, a microprocessor, or any suitable combination of the preceding. The processor 202 is communicatively coupled to and in signal communication with the memory 204. The one or more processors are configured to process data and may be implemented in hardware or software. For example, the processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement a threat management engine 208. In an embodiment, the threat management engine 208 is implemented using logic units, FPGAs, ASICs, DSPs, or any other suitable hardware. The threat management engine 208 is configured to implement a specific set of rules or process that provides an improved technological result.

In one embodiment, the threat management engine 208 is configured to identify and disconnect an endpoint device 106 from accessing the communications network 102 when the endpoint device 106 has device information discrepancies in the device log file 216 and/or a white list 212. In this configuration, the threat management engine 208 provides improved network security and data access control by protecting the communications network 102 from suspicious endpoint devices 106 and malicious activities performed by the suspicious endpoint devices 106. An example of the threat management engine 208 operating in this configuration is described in FIG. 3.

In another embodiment, the threat management engine 208 is configured to identify and disconnect an endpoint device 106 from accessing the communications network 102 when the endpoint device 106 has location information discrepancies in the device log file 216 and/or a white list 212. In this configuration, the threat management engine 208 provides improved network security and data access control by protecting the communications network 102 from suspicious endpoint devices 106 with incorrect location information and malicious activities performed by the suspicious endpoint devices 106. An example of the threat management engine 208 operating in this configuration is described in FIG. 4.

In another embodiment, the threat management engine 208 is configured to identify and disconnect spoofed instances of an endpoint device 106 from accessing the communications network 102. In this configuration, the threat management engine 208 provides improved network security and data access control by detecting and removing malicious endpoint devices 106 that are connected to the communications network 102 as spoofed instances of trusted endpoint devices 106. An example of the threat management engine 208 operating in this configuration is described in FIG. 5.

In another embodiment, the threat management engine 208 is configured to provide temporary port leases to endpoint devices 106 requesting access to the communications network 102. The amount of time the port lease is active depends on the information available about the endpoint device 106 requesting the port lease. In this configuration, the threat management engine 208 provides improved network security and data access control by using time limited port leases that limit the ability for unknown endpoint devices 106 to perform malicious activities on the communications network 102. An example of the threat management engine 208 operating in this configuration is described in FIG. 6.

In another embodiment, the threat management engine 208 is configured to enable or reenable port authentication for ports on a switch 104 when the threat management engine 208 detects discrepancies between information stored for the switch 104 and a port exemption log 220 for the switch 104. In this configuration, the threat management engine 208 provides improved network security and data access control by detecting discrepancies on a switch 104 which may be to detect malicious endpoint devices 106 connected to the switch 104. An example of the threat management engine 208 operating in this configuration is described in FIG. 7.

The memory 204 comprises one or more disks, tape drives, or solid-state drives, and may be used as an over-flow data storage device, to store programs when such programs are selected for execution, and to store instructions and data that are read during program execution. The memory 204 may be volatile or non-volatile and may comprise ROM, RAM, ternary content-addressable memory (TCAM), dynamic random-access memory (DRAM), and static random-access memory (SRAM). The memory 204 is operable to store threat management instructions 210, a whitelist 212, a blacklist 214, a device log file 216, a port lease log file 218, a port exemption log 220, and/or any other data or instructions. The threat management instructions 210 comprise any suitable set of instructions, logic, rules, or code operable to execute the threat management engine 208.

The whitelist 212 identifies endpoint devices 106 which are known to be trustworthy and are allowed to access the communications network 102. The whitelist 121 may comprise information including, but not limited to, endpoint device identifiers, MAC addresses, IP addresses, switch identifiers, switch port addresses, time stamps, any other suitable type of information, and/or combinations thereof. An example of a whitelist 212 includes, but is not limited to, a MAB whitelist. In one embodiment, the system 100 (e.g. the NAS 108) is configured to automatically authenticate an endpoint device 106 that is present on the whitelist 212.

The blacklist 214 identifies endpoint devices 106 which are known to be untrustworthy and are prohibited from accessing the communications network 102. The blacklist 214 may comprise information including, but not limited to, endpoint device identifiers, MAC addresses, IP addresses, switch identifiers, switch port addresses, time stamps, any other suitable type of information, and/or combinations thereof. For example, the blacklist 214 may identify endpoint devices 106 blocked from accessing the communications network 102. The blacklist 214 may also identify ports on a switch 104 that an endpoint device 106 has been blocked from. In one embodiment, the system 100 (e.g. the NAS 108) is configured to automatically fail authentication for an endpoint device 106 that is present on the blacklist 214.

The device log file 216 identifies endpoint devices 106 that have either passed or failed authentication with the NAS 108. The device log file 216 may comprise information including, but not limited to, endpoint device identifiers, MAC addresses, IP addresses, switch port addresses, time stamps, any other suitable type of information, and/or combinations thereof. In one embodiment, an endpoint device identifier may be used with the device log file 216 to look-up and determine whether an endpoint device 106 linked with the device identifier has previously been authenticated or has previously failed authentication with the NAS 108.

The port lease log file 218 identifies endpoint devices 106 with a lease on a port of a switch 104. A port lease allows access to the communications network 102 via a particular port of a switch 104 for some period of time. A port lease may be set for thirty minutes, one hour, six hours, twenty four hours, or any other suitable period of time. The port lease log file 218 may comprise information including, but not limited to, endpoint device identifiers, MAC addresses, IP addresses, switch identifiers, switch port addresses, port lease periods, time stamps, any other suitable type of information, and/or combinations thereof. For example, an endpoint device identifier (e.g. a MAC address) may be used with the port lease log file 218 may be used to look-up and determine whether an endpoint device 106 linked with the identifier has an active port lease. The port lease log file 218 may also identify the switch 104 and the port where the port lease is active.

The port exemption log 220 comprises information about the port settings of a switch 104. In one embodiment, the port exemption log 220 identifies ports on a switch 104 configured to bypass authentication and device information for endpoint devices 106 connected to ports on the switch 104 configured to bypass authentication. In other examples, the port exemption log 220 may comprise any other suitable information about a switch 104 and/or endpoint devices 106 connected to ports of the switch 104.

The network interface 206 is configured to enable wired and/or wireless communications. The network interface 206 is configured to communicate data through the system 100, the communications network 102, and/or any other system or domain. For example, the network interface 206 may be configured for communication with a modem, a switch, a router, a bridge, a server, or a client. The processor 202 is configured to send and receive data using the network interface 206 from the communications network 102.

Figure 3:
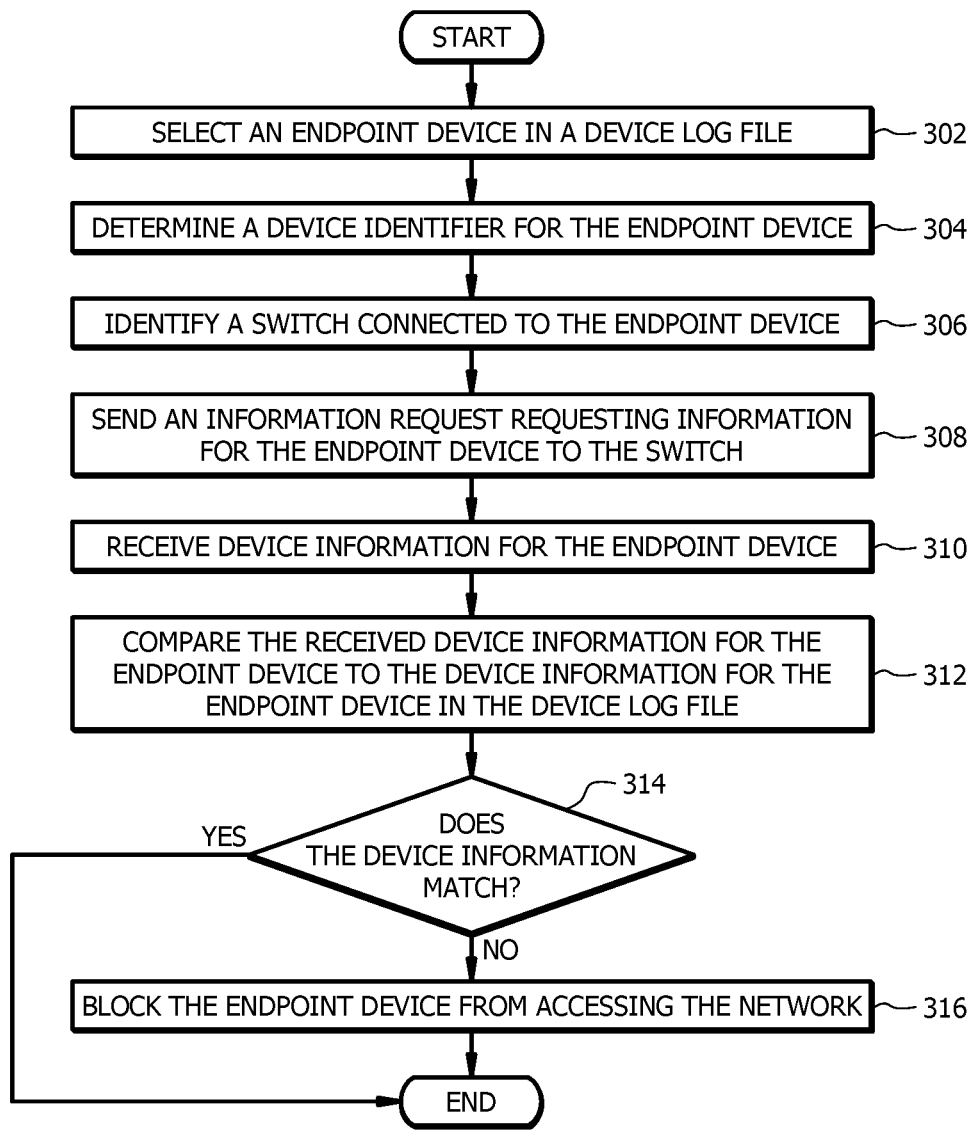
FIG. 3 is a flowchart of an embodiment of a device information validation method.

FIG. 3 is a flowchart of an embodiment of a device information validation method 300. Method 300 is implemented by the threat management server 112 to identify and disconnect an endpoint device 106 from accessing the communications network 102 when the endpoint device 106 has device information discrepancies in the device log file 216 and/or a white list 212. In some instances, device information for an endpoint device 106 stored in the device log file 216 and/or white lists 212 may be incorrect. For example, the stored device information for an endpoint device 106 may have the wrong device category information. Device information errors do not limit an endpoint device's 106 ability to communicate with the communications network 102. However, these types of errors leave the system vulnerable due to discrepancies between the stored information and the real information for a particular endpoint device 106. For example, in a conventional system a malicious endpoint device 106 may provide false information when authenticating itself to avoid being detected by the system. Conventional systems are unable to detect or resolve any discrepancies (e.g. device information errors and false information) between the stored information and the real information for the malicious endpoint device 106. In contrast, system 100 provides a mechanism for identifying discrepancies between the stored information and the real information for the malicious endpoint device 106 and blocking the malicious endpoint device 106 from accessing the communications network 102.

A non-limiting example is provided to illustrate how the threat management server 112 implements method 300 to identify device information discrepancies for an endpoint device 106 and to block the endpoint device 106 from accessing the communications network 102. As an example, the threat management server 112 periodically reviews a device log file 216 to determine whether there are any device information discrepancies for any of the endpoint devices 106 connected to the communications network 102.

At step 302, the threat management server 112 select an endpoint device 106 in the device log file 216. In one embodiment, the threat management server 112 may sequentially select an endpoint device 106 from the device log file 216. In another embodiment, the threat management server 112 may randomly select an endpoint device 106 from the device log file 216. In another embodiment, the threat management server 112 selects endpoint devices 106 that have previously passed authentication with NAS 108 based on information provided in the device log file 216. In one embodiment, the threat management server 112 does not select an endpoint device 106 that uses an 802.1X protocol for authentication. In other embodiments, the threat management server 112 selects an endpoint device 106 using any other suitable technique.

At step 304, the threat management server 112 determines a device identifier for the endpoint device 106. The device log file 216 may list several endpoint devices 106 with their corresponding device identifiers. For example, the device log file 216 may list the MAC address and/or IP address as a device identifier for the selected endpoint device 106. In other examples, the threat management server 112 may use any other suitable device identifier for the selected endpoint device 106.

At step 306, the threat management server 112 identifies a switch 104 connected to the endpoint device 106. In one embodiment, the device log file 216 includes information identifying the switch 104 connected to the endpoint device 106. In other embodiments, the threat management server 112 queries the communications network 102 to identify the switch 104 connected to the endpoint device 106. For example, the threat management server 112 may broadcast a message requesting information for switches 104 connected to the endpoint device 106. In other embodiments, the threat management server 112 may employ any other suitable technique or protocol for identifying the switch 104 connected to the endpoint device 106.

At step 308, the threat management server 112 sends an information request requesting information for the endpoint device 106 to the switch 104. The information request may request a device identifier, a device category type, a device vendor, and/or any other suitable type of information about the endpoint device 106. The information request may be any suitable type of message and/or format as would be appreciated by one of ordinary skill in the art. For example, the threat management server 112 may use a simple network management protocol (SNMP) to communicate with the switch 104. At step 310, the threat management server 112 receives device information for the endpoint device 106.

At step 312, the threat management server 112 compares the received device information for the endpoint device 106 to the device information for the endpoint device 106 in the device log file 216. At step 314, the threat management server 112 determines whether the received device information for the endpoint device 106 and the device information for the endpoint device 106 in the device log file 216 are the same. For example, the threat management server 112 may determine whether the device identifier, the device category type, and/or the device vendor of the endpoint device 106 are the same as (i.e. match) the information in the device log file 216. In other examples, the threat management server 112 may compare any other information received for the endpoint device 106 with the information in the device log file 216. The threat management server 112 proceeds to step 316 when the received device information for the endpoint device 106 and the device information for the endpoint device 106 in the device log file 216 are the different.

The threat management server 112 terminates method 300 when the received device information for the endpoint device 106 and the device information for the endpoint device 106 in the device log file 216 are the same. In other words, the stored device information for the endpoint device 106 is accurate and consistent with the device information obtained from the switch 104 about the endpoint device 106. The threat management server 112 may repeat method 300 again (i.e. return to step 302) to continue looking for information discrepancies with any other endpoint devices 106 connected to the communications network 102.

At step 316, the threat management server 112 blocks the endpoint device 106 from accessing the communications network 102 in response to determining the received device information for the endpoint device 106 and the device information for the endpoint device 106 in the device log file 216 are the different.

In one embodiment, the threat management server 112 sends a blackhole command identifying the endpoint device 106 to the switch 104. For example, the blackhole command may comprise the device identifier for the endpoint device 106. The switch 104 is configured to transform the destination traffic associated with the endpoint device 106 to a null destination in response to receiving the blackhole command. In another embodiment, the switch 104 is configured to discard traffic associated with the endpoint device 106 in response to receiving the blackhole command.

In another embodiment, the threat management server 112 sends a disable command identifying the endpoint device 106 to the switch 104. The switch 104 is configured to disable the port on the switch 104 that the endpoint device 106 is connected to in response to receiving the disable command. For example, the switch 104 may logically disable the port or transition the port to an inactive state. In another embodiment, the switch 104 is configured to disconnect electrical power to the port on the switch 104 that the endpoint device 106 is connected to in response to receiving the disable command. For example, the switch 104 may actuate an electronic switch to disconnection electrical power to the port. In other examples, the switch 104 may disable the port using any other suitable technique as would be appreciated by one of ordinary skill in the art.

In other embodiments, the threat management server 112 may block the endpoint device 106 from accessing the communications network 102 using any other suitable technique as would be appreciated by one of ordinary skill in the art.

In one embodiment, the threat management server 112 adds the endpoint device 106 to a blacklist 214 in response to blocking the endpoint device 106 from accessing the communications network 102. In some embodiments, adding the endpoint device 106 to the blacklist 214 triggers the NAS 108 to automatically fail authentication for the endpoint device 106 the next time the endpoint device 106 connects to the switch 104. In one embodiment, the threat management server 112 removes the endpoint device 106 from a white list 212 when the endpoint device 106 is present in a white list 212.

In one embodiment, the threat management server 112 sends an alert identifying the endpoint device 106 in response to blocking the endpoint device 106 from accessing the communications network 102. In one embodiment, a user can request to receive alerts based on user defined rules or criteria. For example, a user may request to receive an alert when an endpoint device 106 with a MAC address within a particular range of MAC addresses is blocked from accessing the communications network 102. User defined rules may include, but are not limited to, device identifiers, MAC addresses, IP address, port addresses, device manufactures, vendors, any other suitable criteria, and/or combinations of criteria. The user may also provided delivery preferences that define how the alert should be sent. For example, a user may request alerts via email, text, or any other suitable delivery technique. The threat management server 112 sends the alert to the user in accordance with the user defined rules and delivery preferences.

Figure 4:
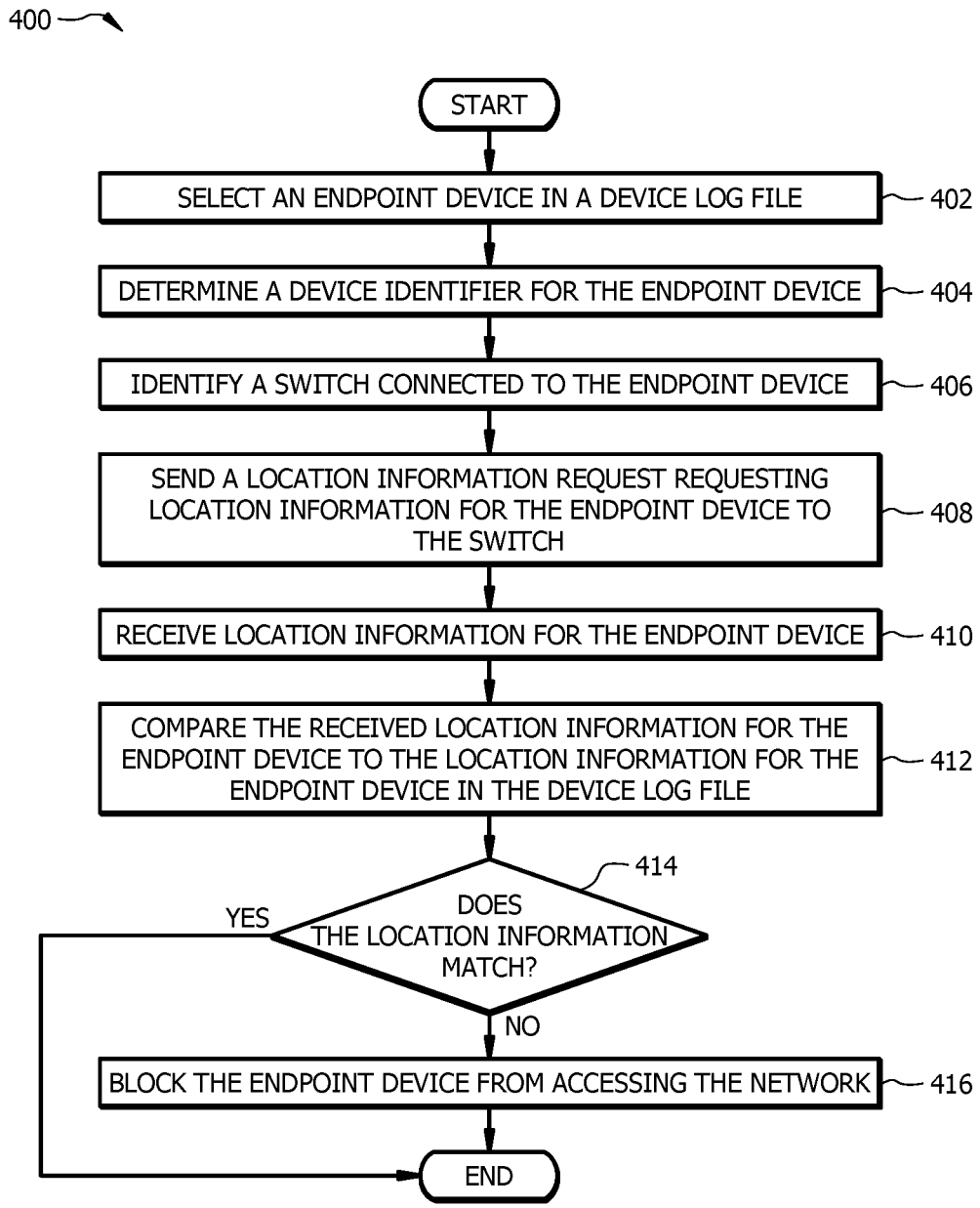
FIG. 4 is a flowchart of an embodiment of a device location validation method.

FIG. 4 is a flowchart of an embodiment of a device location validation method 400. Method 400 is implemented by the threat management server 112 to identify and disconnect an endpoint device 106 from accessing the communications network 102 when the location of the endpoint device 106 does not match the location information in the device log file 216 and/or white list 212. In some instances, location information for an endpoint device 106 stored in the device log file 216 and/or white list 212 may be incorrect. For example, the stored location information for an endpoint device 106 may have the wrong location region (e.g. country). Location information errors do not limit an endpoint device's 106 ability to communicate with the communications network 102. However, these types of errors leave the system vulnerable due to discrepancies between the stored information and the real location of the endpoint device 106. For example, in a conventional system a malicious endpoint device 106 may provide false information when authenticating itself to avoid being detected by the system. Conventional systems are unable to detect or resolve any location discrepancies between the stored location information and the real location of the malicious endpoint device 106. In contrast, system 100 provides a mechanism for identifying discrepancies between stored location information and the real location of the malicious endpoint device 106 and blocking the malicious endpoint device 106 from accessing the communications network 102.

A non-limiting example is provided to illustrate how the threat management server 112 implements method 400 to identify location information discrepancies for an endpoint device 106 and to block the endpoint device 106 from accessing the communications network 102. As an example, the threat management server 112 periodically reviews a device log file 216 to determine whether there are any device information discrepancies for any of the endpoint device 106 connected to the communications network 102.

At step 402, the threat management server 112 select an endpoint device 106 in the device log file 216. The threat management server 112 may select an endpoint device 106 from the device log file 216 using a process similar to the process described in step 302 of FIG. 3.

At step 404, the threat management server 112 determines a device identifier for the endpoint device 106. The threat management server 112 may determine the device identifier for the endpoint device 106 using a process similar to the process described in step 304 of FIG. 3.

At step 406, the threat management server 112 identifies a switch 104 connected to the endpoint device 106. The threat management server 112 may identify the switch 104 connected to the endpoint device 106 using a process similar to the process described in step 306 of FIG. 3.

At step 408, the threat management server 112 sends a location information request to the switch 104. For example, the threat management server 112 may use SNMP to communicate with the switch 104. The location information request requests location information for the endpoint device 106 to the switch 104. The location information request may request a physical location (e.g. a physical address, a geographic region), global positioning system (GPS) coordinates, a region identifier (e.g. a country identifier), and/or any other suitable type of information describing the physical location of the endpoint device 106. The location information request may be any suitable type of message and/or format as would be appreciated by one of ordinary skill in the art. In some embodiments, the threat management server 112 may also request other information (e.g. device information) about the endpoint device 106. At step 410, the threat management server 112 receives location information for the endpoint device 106.

At step 412, the threat management server 112 compares the received location information for the endpoint device 106 to the location information for the endpoint device 106 in the device log file 216. At step 414, the threat management server 112 determines whether the received location information for the endpoint device 106 and the location information for the endpoint device 106 in the device log file 216 are the same. In other words, the threat management server 112 determines whether the endpoint device 106 is actually located in the same location identified in the device log file 216. The threat management server 112 proceeds to step 416 when the received location information for the endpoint device 106 and the location information for the endpoint device 106 in the device log file 216 are the different. In other words, the threat management server 112 proceeds to step 416 in response to determining that the endpoint device 106 is not at the location identified by the device log file 216.

The threat management server 112 terminates method 400 when the received location information for the endpoint device 106 and the location information for the endpoint device 106 in the device log file 216 are the same. In other words, the threat management server 112 terminates method

400 when the stored location information for the endpoint device 106 is accurate and consistent with the location information obtained from the switch 104 about the endpoint device 106. The threat management server 112 may repeat method 400 again (i.e. return to step 402) to continue looking for location information discrepancies with any other endpoint devices 106 connected to the communications network 102.

At step 416, the threat management server 112 blocks the endpoint device 106 from accessing the communications network 102 in response to determining the received location information for the endpoint device 106 and the location information for the endpoint device 106 in the device log file 216 are the different. The threat management server 112 may block the endpoint device 106 from accessing the communications network 102 using a process similar to the process described in step 316 of FIG. 3.

Figure 5:
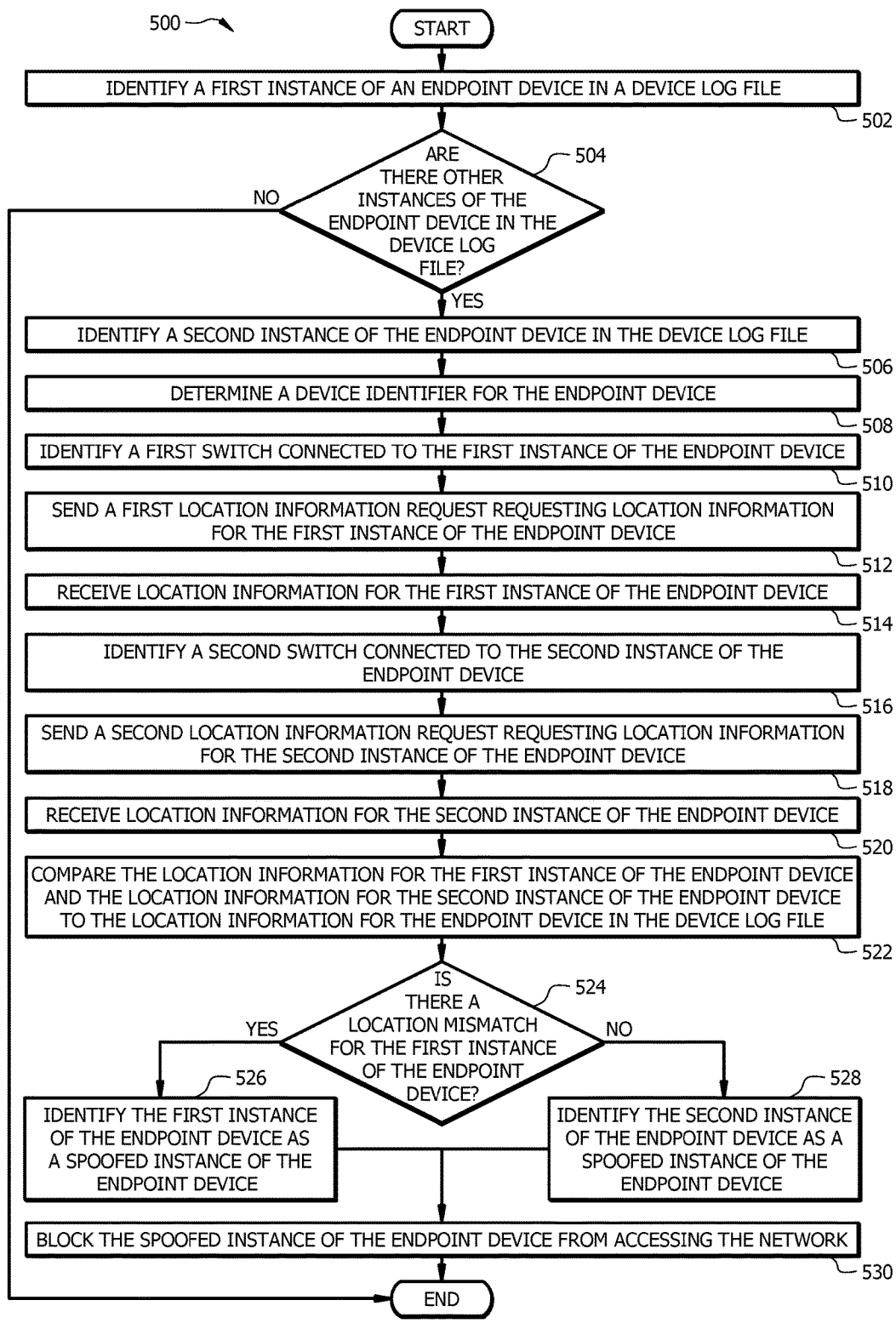
FIG. 5 is a flowchart of an embodiment of a device spoofing detection method.

FIG. 5 is a flowchart of an embodiment of a device spoofing detection method 500. Method 500 is implemented by the threat management server 112 to identify and disconnected spoofed instances of an endpoint device 106 from accessing the communications network 102. A spoofed instance of an endpoint device 106 is a malicious endpoint device 106 that is posing as a trusted endpoint device 106. The malicious endpoint device 106 may use features or characteristics of a trusted endpoint device 106 to avoid being detected by the system. For example, the spoofed instance of an endpoint device 106 may use the location, device identifier, device category type, and/or any other combination of features from a trusted endpoint device 106. Conventional systems are unable to detected spoofed instances of an endpoint device 106 because they are using the information from a trusted endpoint device 106. These systems are unable to distinguish between a trusted endpoint device 106 and a malicious endpoint device 106 posing as a trusted endpoint device 106. In contrast, system 100 provides a mechanism for identifying spoofed instances of an endpoint device 106 and blocking these malicious endpoint device 106 from accessing the communications network 102.

A non-limiting example is provided to illustrate how the threat management server 112 implements method 500 to identify spoofed instances of an endpoint device 106 and to block these malicious endpoint device 106 from accessing the communications network 102. As an example, the threat management server 112 periodically reviews a device log file 216 for determine whether there are any spoofed instances of an endpoint device 106 connected to the communications network 102.

At step 502, the threat management server 112 identifies a first instance of an endpoint device 106 in the device log file 216. In one embodiment, the threat management server 112 may sequentially select an instance of an endpoint device 106 from the device log file 216. In another embodiment, the threat management server 112 may randomly select an instance of an endpoint device 106 from the device log file 216. In other embodiments, the threat management server 112 selects an instance of an endpoint device 106 using any other suitable technique.

At step 504, the threat management server 112 determines whether there are any other instances of the endpoint device 106 in the device log file 216. The threat management server 112 may search the device log file 216 for any other instances of the same endpoint device 106. For example, the threat management server 112 may use a device identifier (e.g. MAC address) to search the device log file 216 for other instances of the endpoint device 106 having the same device identifier. In other examples, the threat management server 112 may use any other suitable technique for determining whether there are any other instances of the endpoint device 106 in the device log file 216.

The threat management server 112 proceeds to step 506 when the threat management server 112 determines there is another instance of the endpoint device 106 in the device log file 216. The threat management server 212 detects the endpoint device 106 has been spoofed by a malicious endpoint device 106 when there are more than one instance of the endpoint device 106 in the device log file 216. The threat management server 112 proceeds to step 506 to identify and block the malicious endpoint device 106. Otherwise, the threat management server 112 terminates method 500 when the threat management server 112 determines there are no other instances of the endpoint device 106 in the device log file 216.

At step 506, the threat management server 112 identifies a second instance of the endpoint device 106 in the device log file 216. For example, the threat management device 112 identifies the duplicate instance of the endpoint device 106 as the second instance of the endpoint device 106.

At step 508, the threat management server 112 determines a device identifier for the endpoint device 106. The device log file 216 may list several endpoint devices 106 with their corresponding device identifiers. For example, the device log file 216 may list the MAC address and/or IP address as a device identifier for the first instance of the endpoint device 106. In other examples, the threat management server 112 may use any other suitable device identifier for the first instance of the endpoint device 106.

At step 510, the threat management server 112 identifies a first switch 104 connected to the first instance of the endpoint device 106. In one embodiment, the device log file 216 includes information identifying the first switch 104 connected to the first instance of the endpoint device 106. In other embodiments, the threat management server 112 queries the communications network 102 to identify the first switch 104 connected to the first instance of the endpoint device 106. For example, the threat management server 112 may broadcast a message requesting information for switches 104 connected to the first instance of the endpoint device 106.

At step 512, the threat management server 112 sends a first location information request requesting location information for the first instance of the endpoint device 106 to the first switch 104. For example, the threat management server 112 may use SNMP to communicate with the switch 104. The location request may request a physical location (e.g. a physical address, geographic region), GPS coordinates, a region identifier (e.g. a country identifier), and/or any other suitable type of information describing the physical location of the first instance of the endpoint device 106. In some instances, the threat management server 112 may also request other information (e.g. device information) about the first instance of the endpoint device 106. At step 514, the threat management server 112 receives location information for the first instance of the endpoint device 106.

At step 516, the threat management server 112 identifies a second switch 104 connected to the second instance of the endpoint device 106. The threat management server 112 identifies the second switch 104 connected to the second instance of the endpoint device 106 using a process similar to the process described in step 510.

At step 518, the threat management server 112 sends a second location information request requesting location information for the second instance of the endpoint device 106 to the second switch 104. The threat management server 112 sends a second location information request to the second switch 104 using a process similar to the process described in step 512. At step 520, the threat management server 112 receives location information for the second instance of the endpoint device 106.

At step 522, the threat management server 112 compares the location information for the first instance of the endpoint device 106 and the location information for the second instance of the endpoint device 106 to the location information for the endpoint device 106 in the device log file 216. At step 524, the threat management server 112 determines whether there is a location mismatch between the location information for the first instance of the endpoint device 106 and the location information for the endpoint device 106 in the device log file 216. In other words, the threat management server 112 determines whether the first instance of the endpoint device 106 is located at the location identified by the device log file 216 for the endpoint device 106.

The threat management server 112 proceeds to step 526 when there is a location mismatch between the location information for the first instance of the endpoint device 106 and the location information for the endpoint device 106 in the device log file 216. A location mismatch between the location information for the first instance of the endpoint device 106 and the location information for the endpoint device 106 in the device log file 216 indicates that the first instance of the endpoint device 106 is a malicious device spoofing the endpoint device 106. At step 526, the threat management server 112 identifies the first instance of the endpoint device 106 as a spoofed instance of the endpoint device 106.

Returning to step 524, the threat management server 112 proceeds to step 528 when there is not a location mismatch between the location information for the first instance of the endpoint device 106 and the location information for the endpoint device 106 in the device log file 216. Having no location mismatch between the location information for the first instance of the endpoint device 106 and the location information for the endpoint device 106 in the device log file 216 indicates that the second instance of the endpoint device 106 is a malicious device spoofing the endpoint device 106. At step 528, the threat management server 112 identifies the second instance of the endpoint device 106 as a spoofed instance of the endpoint device 106.

At step 530, the threat management server 112 blocks the spoofed instance of the endpoint device 106 from accessing the communications network 102. The threat management server 112 may block the spoofed instance of the endpoint device 106 from accessing the communications network 102 using a process similar to the process described in step 316 of FIG. 3.

Figure 6:
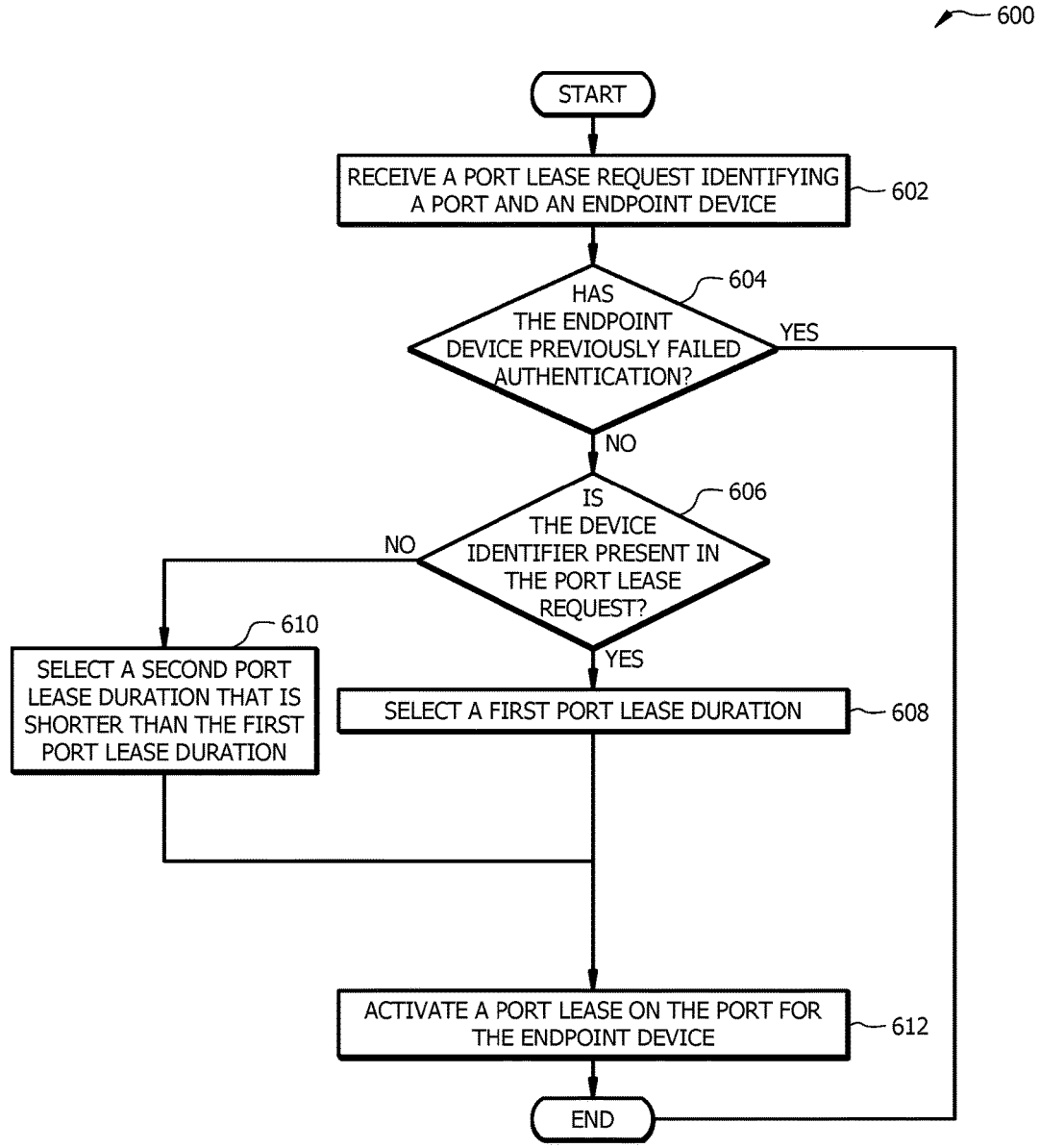
FIG. 6 is a flowchart of an embodiment of a port leasing method.

FIG. 6 is a flowchart of an embodiment of a port leasing method 600. Method 600 is implemented by the threat management server 112 to provide temporary port leases to endpoint devices 106 requesting access to the communications network 102. In some instances an endpoint device 106 may need to connect to the communications network 102, but is unable to authenticate itself. For example, an endpoint device 106 may be new device or an unconfigured device that is unable to authenticate itself with the network. Conventional systems employ an all or nothing approach when an endpoint device 106 is unable to authenticate itself. These systems are unable to determine whether the endpoint device 106 is a malicious device or a trustworthy device and may choose to either always prevent access to the communications network 102 or to always allow access to the communications network 102. In a conventional system, once the endpoint device 106 has access to the communications network 102 the system is unable to limit the endpoint device's 106 ability to access the network. Due to the lack of data access control, conventional systems are vulnerable to malicious activities that may be performed by an unknown endpoint device 106 once the device has access to the network. In contrast, system 100 provides a mechanism for providing data access control to unknown endpoint devices 106 that request access to the communications network 102. By providing data access control, the system 100 limits an unknown endpoint device's 106 ability perform malicious activities on the communications network 102.

A non-limiting example is provided to illustrate how the threat management server 112 implements method 600 to provide data access control for endpoint devices 106 requesting access to the communications network 102. As an example, a network technician may be working on a new device that is joining the communications network 102. As part of the installation or configuration process, the network technician may need to connect the device to the communications network 102, however the new device may not be configured yet and is unable to authenticate itself with the communications network 102. In this example, the new device is connected to a port on a switch and a port lease is requested to allow the new device to access the communications network 102.

At step 602, the threat management server 112 receives a port lease request identifying a port on a switch 104 and an endpoint device 106. The port lease request may be any suitable type of message and/or format as would be appreciated by one of ordinary skill in the art. The port lease request allows access to the communications network 102 to be requested using different types of available information about an endpoint device 106. In one embodiment, the port lease request identifies the endpoint device 106 using the MAC address of the endpoint device 106 as a device identifier. For example, if the endpoint device 106 is a new laptop, the port lease request may comprise an IP address identifying the port on the switch 104 and a MAC address identifying the laptop.

In other embodiments, the port lease request identifies the port and/or endpoint device 106 using any other suitable type of descriptor. The port and/or endpoint device 106 may be identified by name, user-defined name, vendor, device category, any other suitable descriptor, or combinations thereof. For example, if the endpoint device 106 is an automated teller machine (ATM) and the MAC address is unknown, the port lease may comprise an IP address identifying the port on the switch 104 and a device category identifying the ATM.

At step 604, the threat management server 112 determines whether the endpoint device 106 has previously failed authentication with the NAS 108. The threat management server 112 uses the device log file 216 to determine whether the endpoint device 106 has previously failed authentication and/or has been blocked from accessing the communications network 102. For example, the threat management server 112 uses information provided in the port lease request (e.g. MAC address) to look-up whether the endpoint device 106 is present in the device log file 216. The device log file 216 comprises historical information about whether the endpoint device 106 has previously failed authentication with the NAS 108. The threat management server 112 proceeds to step 606 when the threat management server 112 determines the endpoint device 106 has not previously failed authentication and/or has not been blocked from accessing the communications network 102. The threat management server 112 terminates method 600 when the threat management server 112 determines the endpoint device 106 has previously failed authentication and/or has been blocked from accessing the communications network 102. In this case, the threat management server 112 automatically denies the port lease request for the endpoint device 106.

At step 606, the threat management server 112 determines whether a device identifier for the endpoint device 106 is present in the port lease request. The device identifier is a descriptor that uniquely identifies the endpoint device 106. For example, the threat management server 112 determined whether the port lease request comprises a MAC address for the endpoint device 106. The presence of the device identifier may indicate that the endpoint device 106 is trustworthy and is eligible for a longer port lease. The threat management server 112 proceeds to step 608 when a device identifier for the endpoint device 106 is present in the port lease request. The first port lease duration may be any suitable amount of time. At step 608, the threat management server 112 selects a first port lease duration. The first port lease duration may be any suitable amount of time. For example, the first port lease duration may be 12 hours, 24 hours, 48 hours, etc.

Returning to step 606, the threat management server 112 proceeds to step 610 when a device identifier for the endpoint device 106 is not present in the port lease request. A generic device descriptor may be used when a unique device identifier is not known or available. The absence of the device identifier may indicate that the trust level of the endpoint device 106 is unknown and for network security reasons the endpoint device 106 will receive a shorter term port lease. At step 610, the threat management server 112 selects a second port lease duration that is shorter than the first port lease duration. As an example, the first port lease duration may be 24 hours and the second port lease duration may be six hours. The second port lease duration may be any suitable amount of time. For instance, the second port lease duration may be 30 minutes, one hour, two hours, four hours, six hours, etc.

At step 612, the threat management server 112 activates a port lease on the port of the switch 104 for the endpoint device 106 for the selected port lease duration. For example, the threat management server 112 may use SNMP to communicate with the switch 104. The threat management server 112 communicates commands or messages with the switch 104 to activate the port lease on the port for the endpoint device 106. The threat management server 112 may employ any suitable technique or protocol for activating the port lease as would be appreciated by one of ordinary skill in the art.

When the first port duration is used to activate the port lease, the port lease is machine dependent and port independent. In other words, the port lease is linked with the endpoint device 106 and may be used on any port of the switch 104. When the second port duration is used to activate the port lease, the port lease is port dependent and is machine independent. In other words, the port lease is linked with the port on the switch 104 and may be used by any device connected to the port.

In one embodiment, the threat management server 112 adds the endpoint device 106 to a white list 212 in response to activating a port lease for the endpoint device 106.

In one embodiment, the threat management server 112 also sends an information request to the switch 104 requesting a device type for the endpoint device 106. The switch 104 interrogates the endpoint device 106 and sends the device type for the endpoint device 106 to the threat management server 112. The threat management server 112 compares the received device type for the endpoint device 106 to the device type in the port lease request to confirm the same device is requesting the port lease prior to activating the port lease.

In one embodiment, the threat management server 112 also sends an information request to the switch 104 requesting a vendor identifier (e.g. manufacturer) for the endpoint device 106. The switch 104 interrogates the endpoint device 106 and sends the vendor identifier for the endpoint device 106 to the threat management server 112. The threat management server 112 compares the received vendor identifier for the endpoint device 106 to the vendor identifier in the port lease request to confirm the same device is requesting the port lease prior to activating the port lease.

In one embodiment, the threat management server 112 also sends an information request to the switch 104 requesting a device identifier (e.g. MAC address) for the endpoint device 106. The switch 104 interrogates the endpoint device 106 and sends the device identifier for the endpoint device 106 to the threat management server 112. The threat management server 112 compares the received device identifier for the endpoint device 106 to the device identifier in the port lease request to confirm the same device is requesting the port lease prior to activating the port lease.

In other embodiments, the threat management server 112 may request and use any other types of information to confirm the identity of an endpoint device 106 requesting a port lease prior to activating the port lease.

Figure 7:
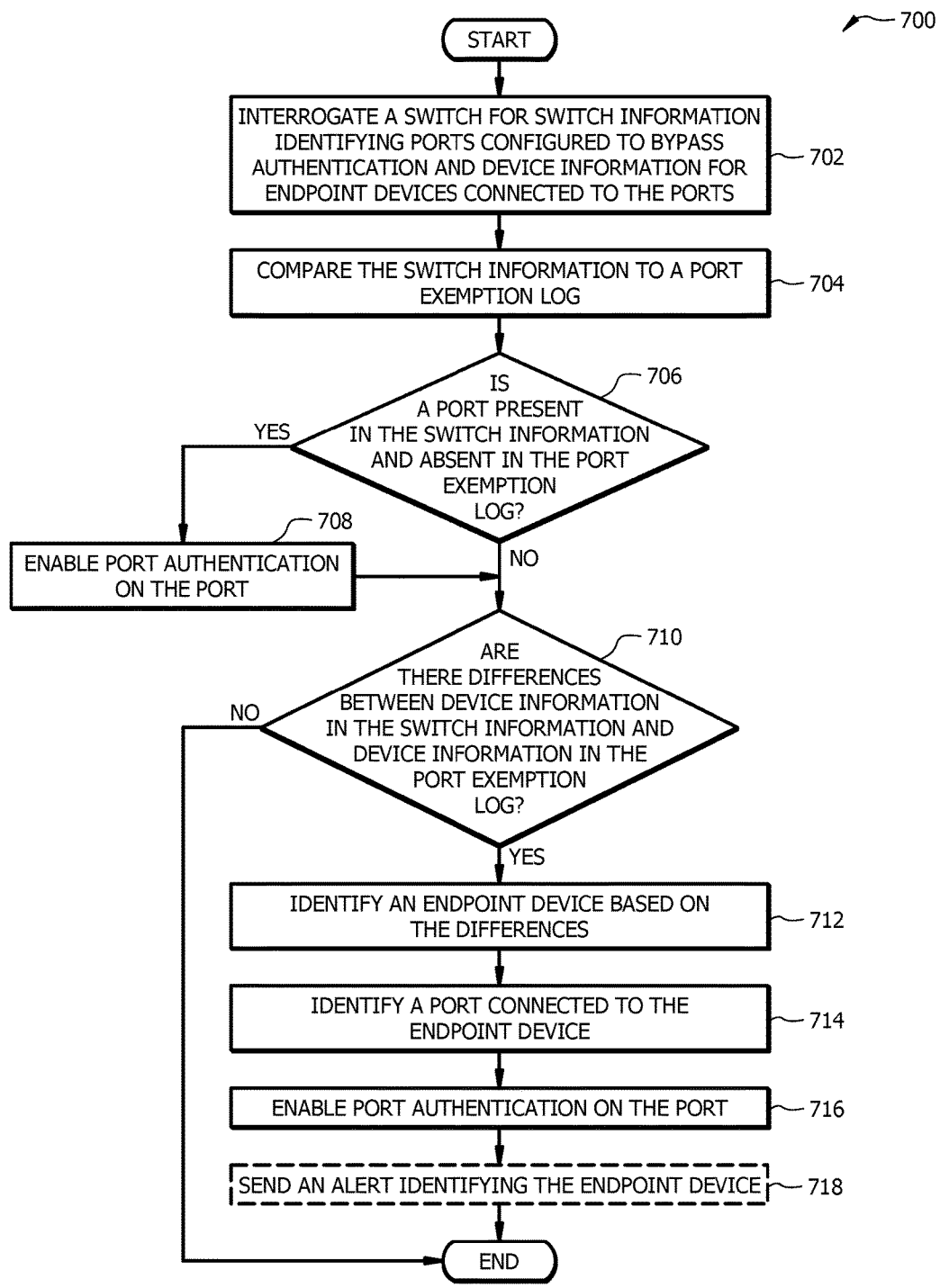
FIG. 7 is a flowchart of an embodiment of a port authentication control method.

FIG. 7 is a flowchart of an embodiment of a port authentication control method 700. Method 700 is implemented by the threat management server 112 to enable port authentication for ports on a switch 104 when the threat management server 112 detects discrepancies between information stored for the switch 104 and port exemption log 220 for the switch 104. For example, the threat management server 112 may detect when a switch 104 has ports configured to bypass authentication that differ from ports identified in the port exemption log 220. In another example, the threat management server 112 may detect when a switch 104 has different endpoint devices 106 connected to its ports configured to bypass authentication than the endpoint devices 106 identified in the port exemption log 220. When an endpoint device 106 is connected to a port that is configured to bypass authentication, the endpoint device 106 does not have to automatically identify itself which allows the endpoint device 106 to connect to the network without detection.

This behavior may be exploited by malicious devices. For example, malicious endpoint devices 106 may pose as a trusted endpoint device 106 to request a port be configured to bypass authentication. Once the port is configured to bypass authentication, the malicious endpoint device 106 is free to perform any kind of malicious activities. Conventional systems are unable to detect or resolve discrepancies between stored information about a switch 104 and the actual configuration of the switch 104, and therefore, are unable to detect malicious endpoint device 106 connected to a switch 104 and the network. In contrast, system 100 provides a mechanism for identifying discrepancies between stored information about a switch 104 and the actual configuration of the switch 104. The ability to detect these kinds of discrepancies allows the system 100 to identify suspicious or malicious endpoint devices 106 connected to a switch 104 and the network.

A non-limiting example is provided to illustrate how the threat management server 112 implements method 700 to identify discrepancies between information stored for a switch 104 and the actual configuration of the switch 104. As an example, the threat management server 112 periodically reviews a port exemption log 220 to determine whether there are any information discrepancies for a switch 104.

At step 702, the threat management server 112 interrogates the switch 104 for switch information identifying ports configured to bypass authentication and device information for endpoint devices 106 connected to the ports. In one embodiment, the threat management server 112 exchanges one or more messages with the switch 104 to obtain switch information identifying ports on the switch 104 configured to bypass authentication and device information for endpoint devices 106 connected to the ports configured to bypass authentication. For example, the threat management server 112 may use SNMP to communicate with the switch 104. The threat management server 112 may interrogate the switch 104 using any suitable technique or protocol as would be appreciated by one of ordinary skill in the art.

In one embodiment, the threat management server 112 generates a virtual map of endpoint devices 106 connected to ports of the switch 104 with their corresponding port settings based on the information received from the switch 104. The virtual map may be a graphical file (e.g. an image), a table, or any other suitable representation.

At step 704, the threat management server 112 compares the switch information to the information in the port exemption log 220. In one embodiment, the port exemption log 220 identifies ports on the switch 104 configured to bypass authentication and device information for endpoint devices 106 connected to the ports configured to bypass authentication. For example, the threat management server 112 compares the ports identified by the port exemption log 220 with the received switch information. As another example, the threat management server 112 compare endpoint device 106 identified by the port exemption log 220 with the received switch information.

At step 706, the threat management server 112 determines whether a port is present in the switch information and absent in the port exemption log 220. The threat management server 112 determines that a port may have been manually configured to bypass authentication when the port is present in the switch information as being configured to bypass authentication and is not present in the port exemption log 220. The threat management server 112 proceeds to step 708 when a port is present in the switch information and is absent in the port exemption log 220. In other words, the threat management server 112 proceeds to step 708 when there is a discrepancy between the received switch information and the port exemption log 220 about a port's configuration. The threat management server 112 proceeds to step 710 when there are no discrepancies between ports in the switch information and the port exemption log 220.

At step 708, the threat management server 112 enables port authentication on the port. The threat management server 112 communicates commands or messages with the switch 104 to enable port authentication on the port. The threat management server 112 may employ any suitable technique or protocol for enabling port authentication as would be appreciated by one of ordinary skill in the art.

Returning to step 706, the threat management server 112 proceeds to step 710 when there are no discrepancies between ports in the switch information and the port exemption log 220. At step 710, the threat management server 112 determines whether there are differences between device information in the switch information and device information in the port exemption log 220. For example, the threat management server 112 determines whether there are any endpoint devices 106 connected to ports configured to bypass authentication that are different from the endpoint devices 106 identified in the port exemption log 220. As another example, the threat management server 112 determines whether there are any endpoint devices 106 connected to ports configured to bypass authentication that are not identified in the port exemption log 220. The threat management server 112 proceeds to step 712 when the threat management server 112 determines there are differences between the device information in the switch information and the device information in the port exemption log 220. Otherwise, the threat management server 112 terminates method 700 when there are no discrepancies between the device information in the switch information and the device information in the port exemption log 220.

At step 712, the threat management server 112 identifies an endpoint device 106 based on the differences between the device information in the switch information and the device information in the port exemption log 220. For example, the threat management server 112 may identify an endpoint device 106 that is connected to a port configured bypass authentication and is either absent from the port exemption log 220 or different from the endpoint device 106 identified in the port exemption log 220.

At step 714, the threat management server 112 identifies the port connected to the endpoint device 106 identified in step 712. At step 716, the threat management server 112 enables port authentication on the port. The threat management server 112 communicates commands or messages with the switch 104 to enable port authentication on the port. The threat management server 112 may employ any suitable technique or protocol for enabling port authentication as would be appreciated by one of ordinary skill in the art.

Optionally, at step 718, the threat management server 112 sends an alert identifying the endpoint device 106. In one embodiment, a user can request to receive alerts based on user defined rules or criteria. For example, a user may request to receive an alert when an endpoint device 106 with a MAC address within a particular range of MAC addresses is blocked from accessing the communications network 102. User defined rules may include, but are not limited to, device identifiers, MAC addresses, IP address, port addresses, device manufactures, vendors, any other suitable criteria, and/or combinations of criteria. The user may also provided delivery preferences that define how the alert should be sent. For example, a user may request alerts via email, text, or any other suitable delivery technique. The threat management server 112 sends the alert to the user in accordance with the user defined rules and delivery preferences.

In one embodiment, the threat management server 112 receives an exemption request requesting an authentication exemption for a port. The threat management server 112 adds the port to the port exemption log 220 in response to receiving the exemption request for the port. The threat management server 112 sends an exemption command identifying the port to the switch 104. The exemption command triggers the switch 104 to bypass authentication for the port.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
    a threat management server in a network, comprising:
        a memory configured to store:
            a device log file identifying device information for endpoint devices that have passed authentication;
        a threat management engine implemented by a processor, and configured to:
            select an endpoint device from the device log file;
            determine a device identifier for the endpoint device based on the device log file;
            identify a switch connected the endpoint device based on the device log file;
            send an information request comprising the device identifier to the switch, wherein the information request requests device information for the endpoint device;
            receive device information for the endpoint device in response to sending the information request;
            compare the received device information for the endpoint device to device information for the endpoint device in the device log file;
            determine the received device information does not match the device information for the endpoint device in the device log file; and
            block the endpoint device from accessing the network in response to determining the received device information does not match the device information for the endpoint device in the device log file; and
    the switch operably coupled to the threat management server, configured to:
        receive the information request for the endpoint device;
        interrogate the endpoint device to collect device information for the endpoint device in response to receiving the information request; and
        send the collected device information to the threat management server.

2. The system of claim 1, wherein the threat management engine is configured to remove the endpoint device from a white list in response to blocking the endpoint device from accessing the network.

3. The system of claim 1, wherein determining the received device information does not match the device information for the endpoint device in the device log file comprises determining a device type for the endpoint device does not match.

4. The system of claim 1, wherein:
    blocking the endpoint device from accessing the network comprises sending a blackhole command to the switch identifying the endpoint device; and
    the switch is configured to transform the destination of traffic associated with the endpoint device to a null destination in response to receiving the blackhole command.

5. The system of claim 1, wherein:
    blocking the endpoint device from accessing the network comprises sending a blackhole command to the switch identifying the endpoint device; and
    the switch is configured to discard traffic associated with the endpoint device in response to receiving the blackhole command.

6. The system of claim 1, wherein:
    blocking the endpoint device from accessing the network comprises sending a disable command to the switch identifying the endpoint device; and
    the switch is configured to disable the port the endpoint device is connected to in response to receiving the disable command.

7. The system of claim 1, wherein:
    blocking the endpoint device from accessing the network comprises sending a disable command to the switch identifying the endpoint device; and
    the switch is configured to disconnect electrical power to the port the endpoint device is connected to in response to receiving the disable command.

8. A threat management server in a network, comprising:
    a memory configured to store:
        a device log file identifying device information for endpoint devices that have passed authentication;
    a threat management engine implemented by a processor, and configured to:
        select an endpoint device from the device log file;
        determine a device identifier for the endpoint device based on the device log file;
        identify a switch connected the endpoint device based on the device log file;
        send an information request comprising the device identifier to the switch, wherein the information request requests device information for the endpoint device;
        receive device information for the endpoint device in response to sending the information request;
        compare the received device information for the endpoint device to device information for the endpoint device in the device log file;
        determine the received device information does not match the device information for the endpoint device in the device log file; and
        block the endpoint device from accessing the network in response to determining the received device information does not match the device information for the endpoint device in the device log file.

9. The device of claim 8, wherein the threat management engine is configured to remove the endpoint device from a white list in response to blocking the endpoint device from accessing the network.

10. The device of claim 8, wherein determining the received device information does not match the device information for the endpoint device in the device log file comprises determining a device type for the endpoint device does not match.

11. The device of claim 8, wherein:
blocking the endpoint device from accessing the network comprises sending a blackhole command to the switch identifying the endpoint device; and
the switch is configured to transform the destination of traffic associated with the endpoint device to a null destination in response to receiving the blackhole command.

12. The device of claim 8, wherein:
blocking the endpoint device from accessing the network comprises sending a blackhole command to the switch identifying the endpoint device; and
the switch is configured to discard traffic associated with the endpoint device in response to receiving the blackhole command.

13. The device of claim 8, wherein:
blocking the endpoint device from accessing the network comprises sending a disable command to the switch identifying the endpoint device; and
the switch is configured to disable the port the endpoint device is connected to in response to receiving the disable command.

14. The device of claim 8, wherein:
blocking the endpoint device from accessing the network comprises sending a disable command to the switch identifying the endpoint device; and
the switch is configured to disconnect electrical power to the port the endpoint device is connected to in response to receiving the disable command.

15. A method comprising:
selecting, by a threat management server in a network, an endpoint device from a device log file identifying device information for endpoint devices that have passed authentication;
determining, by the threat management server, a device identifier for the endpoint device based on the device log file;
identifying, by the threat management server, a switch connected the endpoint device based on the device log file;
sending, by the threat management server, an information request comprising the device identifier to the switch, wherein the information request requests device information for the endpoint device;
interrogating, by the switch, the endpoint device to collect device information for the endpoint device in response to receiving the information request; and
sending, by the switch, the collected device information to the threat management server;
comparing, by the threat management server, the received device information for the endpoint device to device information for the endpoint device in the device log file;
determining, by the threat management server, the received device information does not match the device information for the endpoint device in the device log file; and
blocking, by the threat management server, the endpoint device from accessing the network in response to determining the received device information does not match the device information for the endpoint device in the device log file.

16. The method of claim 15, further comprising removing, by the threat management server, the endpoint device from a white list in response to blocking the endpoint device from accessing the network.

17. The method of claim 15, wherein blocking the endpoint device from accessing the network comprises:
sending, by the threat management server, a blackhole command to the switch identifying the endpoint device; and
transforming, by the switch, the destination of traffic associated with the endpoint device to a null destination in response to receiving the blackhole command.

18. The method of claim 15, wherein blocking the endpoint device from accessing the network comprises:
sending, by the threat management server, a blackhole command to the switch identifying the endpoint device; and
discarding, by the switch, traffic associated with the endpoint device in response to receiving the blackhole command.

19. The method of claim 15, wherein blocking the endpoint device from accessing the network comprises:
sending, by the threat management server, a disable command to the switch identifying the endpoint device; and
disabling, by the switch, the port the endpoint device is connected to in response to receiving the disable command.

20. The method of claim 15, wherein blocking the endpoint device from accessing the network comprises:
sending, by the threat management server, a disable command to the switch identifying the endpoint device; and
disconnecting, by the switch, electrical power to the port the endpoint device is connected to in response to receiving the disable command.

* * * * *